United States Patent [19]

Kimura et al.

[11] 3,904,050

[45] Sept. 9, 1975

[54] AUTOMATIC APPARATUS FOR SUPPLYING LAPS TO A GROUP OF COMBERS

[75] Inventors: Hiroyasu Kimura; Toshiharu Ueda, both of Yokkaichi, Japan

[73] Assignee: Toyo Boseki Kabushiki Kaisha, Osaka, Japan

[22] Filed: July 17, 1974

[21] Appl. No.: 489,429

[30] Foreign Application Priority Data
July 20, 1973 Japan.............................. 48-80676

[52] U.S. Cl................ 214/89; 19/165 R; 198/177; 198/179; 214/340; 214/702; 214/707; 214/750; 214/DIG. 4; 242/55.1
[51] Int. Cl............................................. D01b 3/04
[58] Field of Search............ 214/89, 340, 702, 707, 214/750, DIG. 4; 19/165 R; 198/179; 242/55.1

[56] References Cited
UNITED STATES PATENTS
3,388,432   6/1968   Saikawa et al...................... 19/65 R
3,440,688   4/1969   Yamamoto.......................... 19/65 R

*Primary Examiner*—Robert G. Sheridan
*Attorney, Agent, or Firm*—Milton J. Wayne

[57] ABSTRACT

An automatic apparatus for supplying laps to a group of combers. A plurality of lap carriers and bare-bobbin carriers are carried along a looped passage by an overhead conveyer disposed above a lap lifting machine for transferring laps delivered from a lap forming machine to each lap carrier, and a plurality of devices are provided for supplying laps carried by the lap carriers to a lap stand of the respective combers. The overhead conveyer is stopped when the above-mentioned lap transfer operation to and from the lap carriers is carried out by means of automatic actuation means.

6 Claims, 34 Drawing Figures

PATENTED SEP 9 1975
3,904,050
SHEET 3
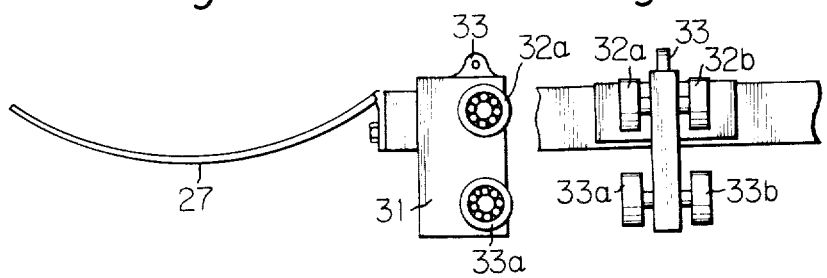
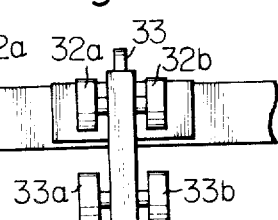
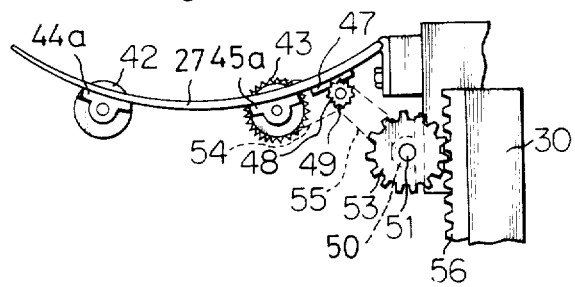
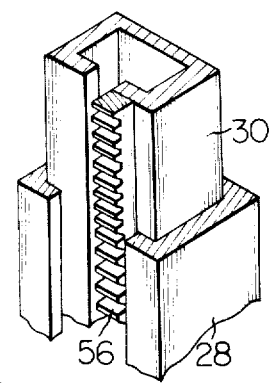
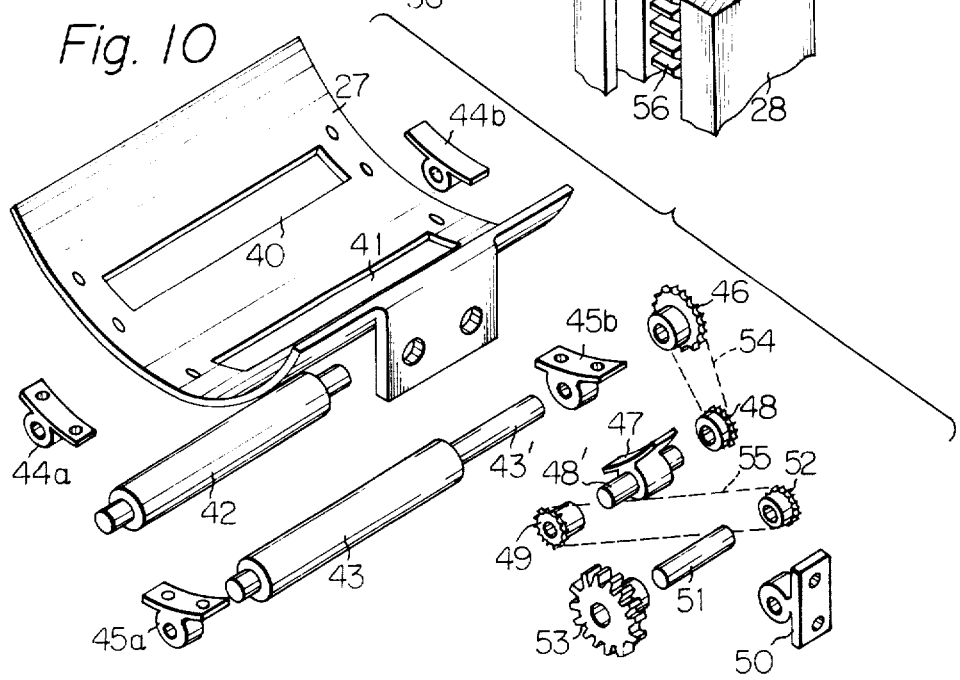

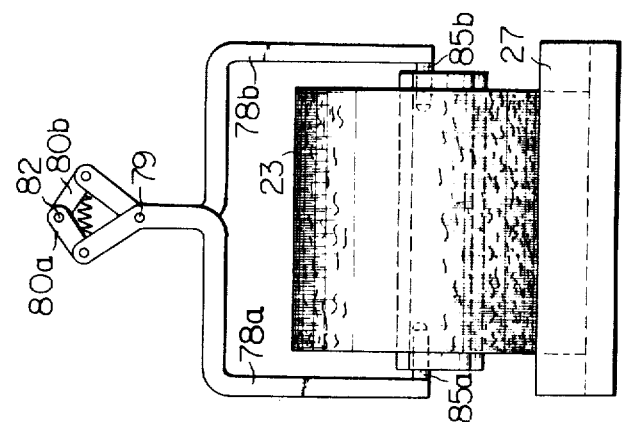
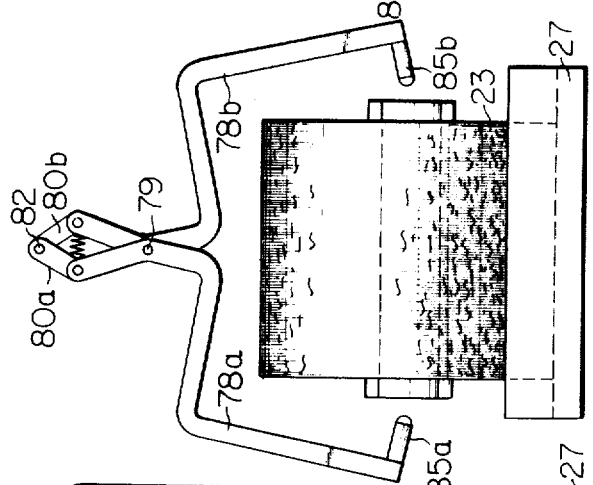
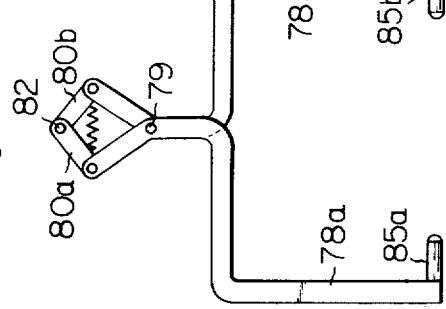

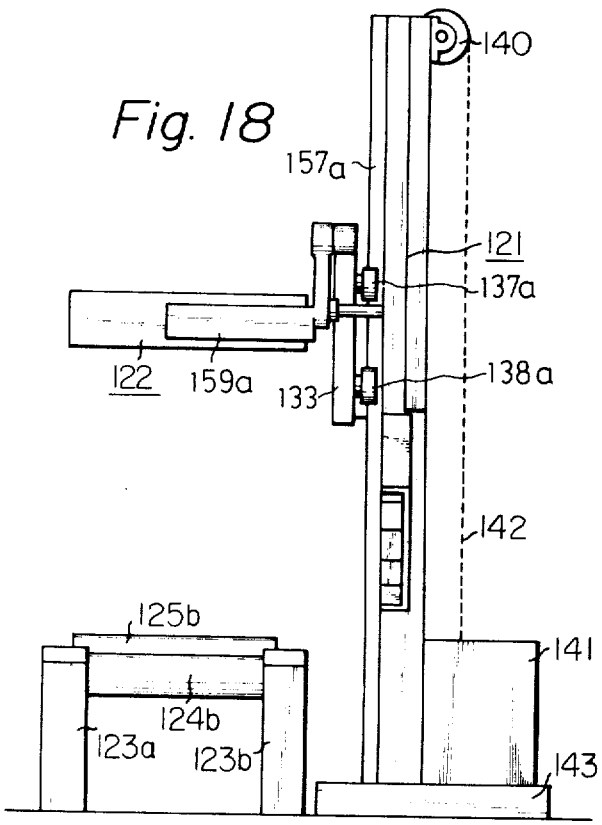
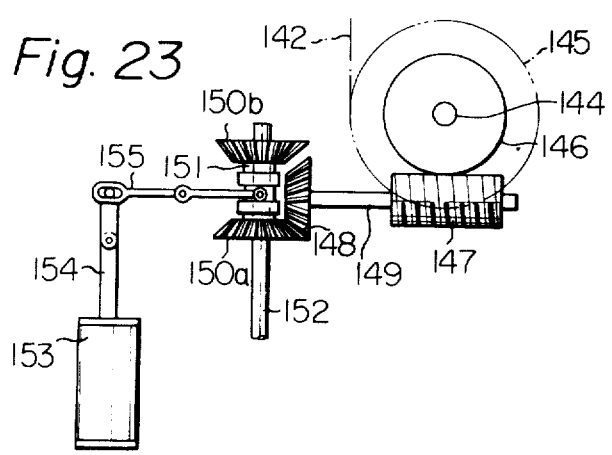

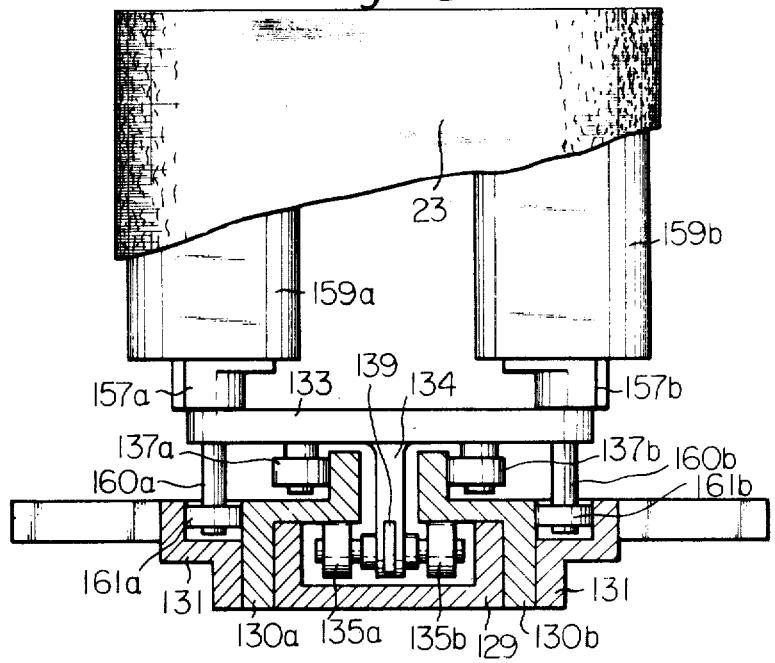
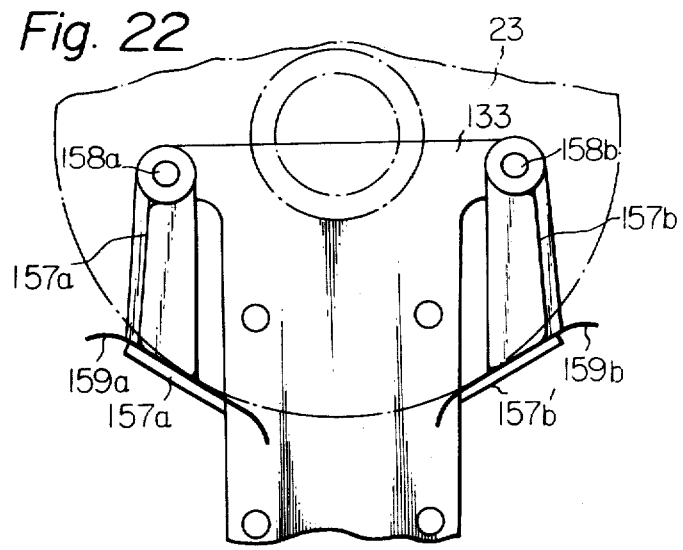

AUTOMATIC APPARATUS FOR SUPPLYING LAPS TO A GROUP OF COMBERS

SUMMARY OF THE INVENTION

The present invention relates to an automatic apparatus for supplying laps to a group of combers, more particularly, to a group of combers such as worsted combers arranged in a row, wherein each comber is provided with a single delivery.

In the conventional worsted spinning process, a type of worsted comber provided with a single delivery has been conventionally used, and a sliver packaged in a can or a top package in the shape of a ball has been used for supplying sliver thereto. In the case of utilizing the sliver cans, a large space is required for positioning the large number of the sliver cans, and the quantity of sliver in the sliver cans is restricted. On the other hand, in the case of utilizing the top balls, it is necessary to install a number of creels for supplying tops and it is quite difficult to supply tops to each comber in a uniform unwound condition. To eliminate the above-mentioned inherent limitations of the conventional supply methods, recent advances in the technology of worsted spinning have resulted in the proposal of a sliver supply system utilizing a lap shaped package. In this new system, as a plural number of the slivers are supplied to a lap forming machine so as to produce a lap wound on a bobbin in compressed condition, the quantity of the wool fibers contained in a package can be remarkably increased; moreover, as the package is made in a comparatively compact condition, the handling of the package becomes very easy, and the web supply to the comber head can be uniformly carried out. However, in the above-mentioned new system, many manual operations are required, such as doffing the full packaged laps from a lap forming machine, carrying the doffed laps from the lap forming machine to the respective lap supply positions of the combers and carrying bare bobbins from the respective combers to the lap forming machine, etc. Together with the recent continuously increasing cost of labor has come a corresponding increase in the importance of the requirement to automate the above-mentioned manual operations so as to reduce production costs.

The principal object of the present invention is to substantially automate the above-mentioned manual operations in the lap supply system so as to reduce the manual labor involved in the worsted spinning process and reduce the labor cost in the process.

To attain the above-mentioned process, in the present invention, an automatic lap lifting device for transferring laps formed by an automatic lap forming machine to an automatic overhead lap conveyer, an automatic device for receiving laps carried by the automatic lap conveyer and for mounting the received laps on a lap stand of each comber, an automatic device for transferring bare bobbins to the automatic lap conveyor, an automatic device for transferring the bare bobbins carried by the lap conveyor to each lap forming machine, etc. are utilized in combination. Even though it has been well known that the overhead lap conveyor system can be utilized for connecting the process of lap formation to the combing process, the present invention, which comprises the above-mentioned combination of novel devices, creates a more effective automatic system which simplifies the numerous operations and reduces labor costs remarkably.

BRIEF EXPLANATION OF THE DRAWINGS

FIG. 6 is a side view of a lap receiving plate utilized for the lap lifting apparatus shown in FIG. 2;

FIG. 7 is a front view of a part of an assembly of the lap receiving plate shown in FIG. 6, taken from the right side of FIG. 6;

FIG. 8 is a side view of an assembly of the lap receiving plate shown in FIG. 6, and attached assembly elements thereof;

FIG. 9 is a perspective view of an upper portion of a lifting channel of the lifting device shown in FIG. 2;

FIG. 10 is a perspective view of the lap receiving plate assembly shown in FIG. 8, wherein elements of the assembly are separated from each other;

FIGS. 15A, 15B, 15C are explanatory drawings of the main part of the lap carrier showing the lap holding motion thereof, according to the present invention;

FIG. 18 is a side view of the lap supply device shown in FIG. 17;

FIG. 19 is a plan view of the lap supply device shown in FIG. 17;

FIG. 22 is a front view of the lap receiving member shown in FIG. 17;

FIG. 23 is a schematic gear diagram of a chain winding mechanism shown in FIG. 18;

DETAILED ILLUSTRATION OF THE INVENTION

Layout of the Component Devices of the Apparatus

For the sake of better understanding of the present invention, an embodiment of the automatic apparatus for supplying laps to a group of worsted combers is hereinafter illustrated in detail.

Figure 1:
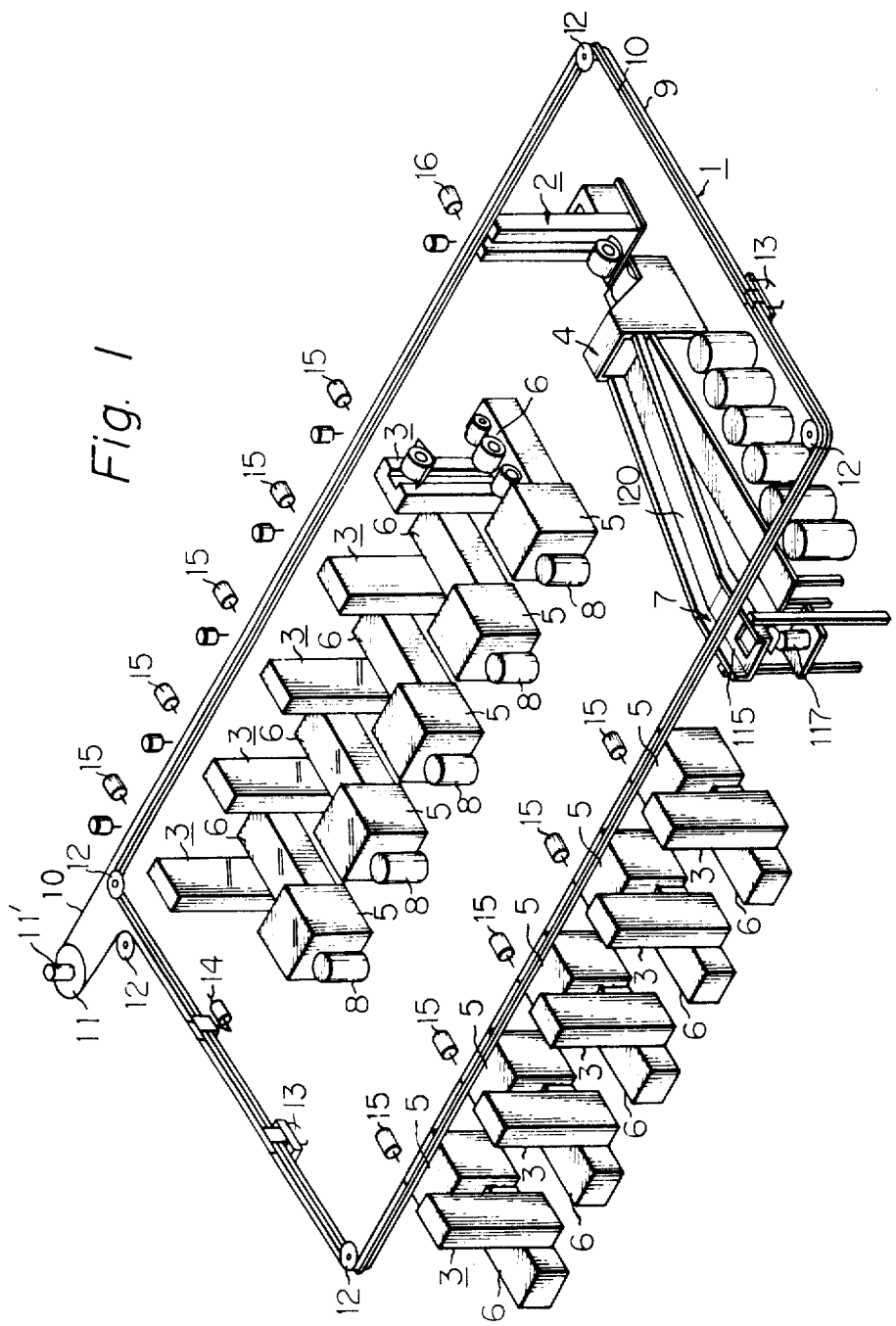
FIG. 1 is a schematic perspective view of the sliver lap supply system according to the present invention.

The layout of the component devices of the apparatus according to the present invention is shown in FIG. 1. As shown in FIG. 1, an overhead endless conveyer 1 is disposed above the component devices such as a lap lifting device 2 and a plurality of lap supply devices 3. The lap lifting device 2 is disposed at a position adjacent to a delivery mechanism of a lap forming machine 4, and each lap supply device 3 is disposed at a side position adjacent to a lap supply stand 6 of each comber 5. A plurality of laps are positioned on the lap supply stand 6 comprising rollers in an axially parallel condition for supplying webs from the laps in superimposed condition to a combing mechanism of the comber 5.

A bare bobbin hopper 7 for supplying bare bobbins to the lap forming machine 4 is disposed at a position below the overhead conveyer 1 as shown in FIG. 1. In each comber 5, the combed sliver is received in cans 8. The overhead conveyer 1 comprises a looped guide rail 9 disposed above the component devices of the apparatus according to the present invention, and an endless chain 10 displaceably mounted above the guide rail 9. The endless chain 10 is positively driven by a sprocket wheel 11 secured to a drive shaft 11' and a plurality of guide sprocket wheels 12 are turnably mounted on respective vertical shafts so as to fix the passage of the endless chain 10. The endless chain 10 is noncontinuously driven as hereinafter illustrated in detail.

A plurality of lap carriers 13 are rigidly suspended from respective elements of the endless chain 10 and a plurality of bare bobbin carriers 14 are also rigidly suspended from respective elements of the endless chain 10 as shown in FIG. 1. The lap carriers 13 and the bare bobbin carriers 14 are carried along the guide rail 9 which defines the passage thereof. A plurality of detectors 15 for detecting the arrival of a lap carrier 13 holding a lap are disposed at positions adjacent to the overhead conveyer 1 in such a way that each detector 15 is positioned at an outside position adjacent to its corresponding lap supply device 3. Another detector 16 for detecting the arrival of a lap carrier 13 not holding a lap is disposed at an outside position adjacent to the overhead conveyer 1 so as to face the lap lifting device 2 as shown in FIG. 1. An actuator (not shown) works to actuate the lap carriers 13 so as to allow them to receive a lap from the lap lifting device 2. Another actuator (not shown) is disposed at each position adjacent to the passage of the lap carriers which is just above each lap supply device 3 so as to transfer a lap from a lap carrier 13 to the lap supply device 3. The detailed construction and function of these actuators will be hereafter illustrated in detail.

As to the lap forming machine, any of the conventional lap forming machines provided with an automatic doffing device can be used for the present invention. The lap forming machine disclosed in U.S. Pat. No. 3,459,386 can be used as a lap forming machine in the present invention.

In a known lap supply device, which transfers full packaged laps delivered from a lap forming machine to an overhead conveyer, a free end of the lap tends to hang from the lap itself, and separate therefrom while being carried by the overhead conveyer. If the free end of the lap is separated during transportation, it is necessary to prepare the feed of the leading end of the lap carefully so as to prevent nonuniform supply of fibers to the comber. To eliminate the above-mentioned undesirable feature of the conventional device, in the lap lifting device according to the present invention, a particular mechanism for preventing the abovementioned free hanging of a leading end of the lap is provided.

In the following illustration of the lap lifting device, the detailed explanation of the manner of lap formation is omitted, because a conventional device such as a lap forming machine disclosed in the U.S. Pat. No. 3,459,386 can be preferably utilized for carrying out the automatic lap supply operation by the apparatus of the present invention.

Figure 2:
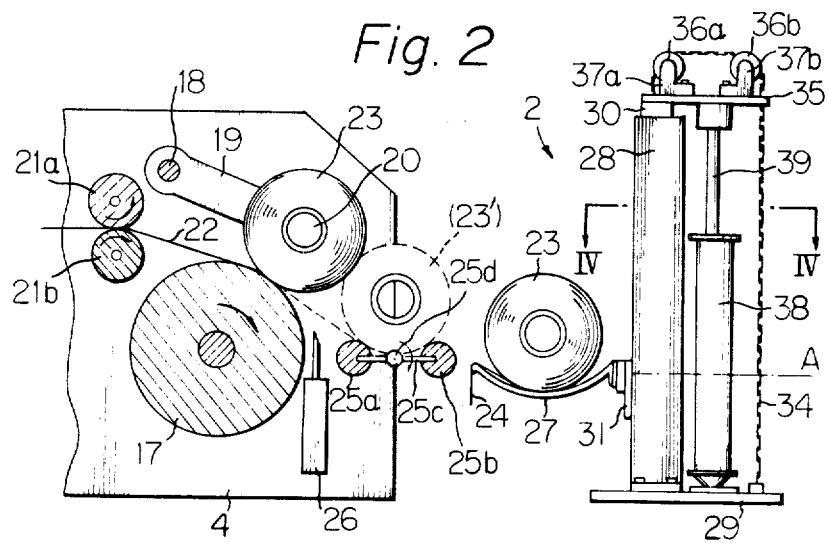
FIG. 2 is a schematic side view of a lap lifting apparatus according to the present invention, together with a schematic side view of a conventional lap forming machine.

Referring to FIG. 2, a lap lifting device 2 is disposed at a position downstream of and close to an automatic doffing mechanism of the lap forming machine 4. The automatic doffing mechanism is provided with a lap roller 17, always rotating in the clockwise direction as shown in FIG. 2; a pair of supporting arms 19 (only one of the arms is shown in FIG. 2), for rotatably supporting a bobbin 20 the supporting arms being turnably mounted on a horizontal shaft 18 secured to the machine frame, and; a cutting means 26 which cuts a continuous web extended to a previous lap 23' doffed from the supporting arms 19. A continuous web 22 is continuously delivered from a pair of delivery rollers 21a, 21b which are urged towards each other, and this web 22 is wound on the bobbin 20 rotatably held by the supporting arms 19, by frictional rotation upon the lap roller 17.

Figure 3:
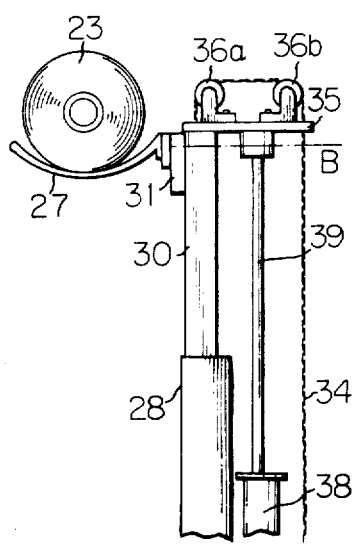
FIG. 3 is a partly omitted side view of the lap lifting apparatus shown in FIG. 2, used to show the operational function thereof.
Figure 4:
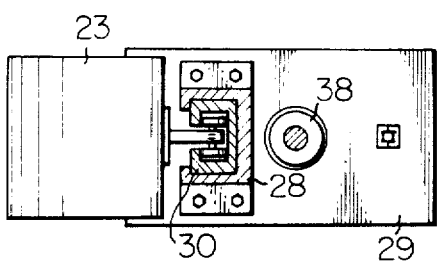
FIG. 4 is a cross-sectional view of the lap lifting apparatus, taken along a line IV—IV in FIG. 2.

When a package of a lap 23 reaches a predetermined size, the full packaged lap is doffed from the supporting arms 19 and is displaced to a rest position formed by a pair of horizontal rollers 25a and 25b mounted on the frame of the doffing mechanism. Upon displacing the full packaged lap 23 to the rest position, the cutter 26 is actuated so that the continuous web extended to the full packaged lap 23 positioned on the horizontal rolls 25a, 25b is severed. Upon completion of the above-mentioned cutting operation, the separated end of the web 22 being delivered from the delivery rollers 21a, 21b is wound on a fresh bobbin 20 which was supplied to the supporting arms 19 during the cutting operation. The lap lifting device 2 of the present invention is provided with a lap receiving plate 27 which is displaceably mounted thereon as described in detail later. The lap receiving plate 27 is reciprocally movable between a lap receiving position A and a lap supply position B, which are shown in FIGS. 2 and 3 respectively. The rollers 25a, 25b are supported by a turnable bracket 25c which can be turned about a horizontal shaft 25d rigidly mounted to the machine frame of the doffing mechanism. After displacement of the full packaged lap 23 onto the rest position formed by the rollers 25a, 25b, the bracket 25c is turned clockwise in FIG. 2, so that the full packaged lap 23 is transferred to the lap receiving plate 27 of the lap supply device 2 as shown in FIG. 2, wherein the lap receiving plate 27 is positioned at its receiving position A. The lap lifting device 2 comprises a main upright pillar 28 rigidly mounted on a base 29. The pillar 28 is made of channel section steel as seen in FIG. 4. A channel 30 is slidably disposed in the upright pillar 28. A lifting member 31 is movably mounted in the channel 30 by means of pairs of pulleys 32a, 32b, 33a, 33b (FIG. 7) so as to be able to slide upward or downward, and the lap receiving plate 27 is rigidly supported by the lifting member 31. A projection 33 is formed at the top portion of the lifting member 31 and is connected to a chain 34. A horizontal plate 35 is rigidly mounted on top of the channel 30. A pair of pulleys 36a, 36b are turnably mounted on the respective brackets 37a, 37b rigidly mounted on the horizontal plate 35. A hydraulic cylinder 38 is rigidly mounted on the base 29 in an upright position and a top end of a piston rod 39 of the hydraulic cylinder 31 is secured to the horizontal plate 35. The bottom end of the chain 34 is secured to the base 29 and the other end of the chain 34 is connected to the projection 33 by way of the pulleys 36a and 36b.

When the hydraulic cylinder 38 is pressurized by supplying a liquid under pressure thereto, the horizontal plate 35 is displaced upward according to the lifting motion of the piston rod 39 as shown in FIG. 3 and, consequently, the channel 30 is also displaced upward. However, as lifting member 31 is connected to the chain 34, the lifting member 31 can be displaced for a distance which is twice the lifting distance of the channel 30, as explained below. Consequently, the lap receiving plate 27 is displaced to the supply position B shown in FIG. 3.

When the full packaged lap 23 is displaced from the rest position of the automatic doffer of the lap forming machine 4 to the lap receiving plate 27 of the lap supply device 2, the package 23 rolls in the same direction as that of unwinding. Consequently, when the lap 23 is displaced to the lap receiving plate 27, a free end 24 of the lap 23 hangs from the lap receiving plate 27 as shown in FIG. 2.

As already explained, this free end 24 of the lap 23 causes non-uniformities in the automatic lap supply motion. To eliminate such non-uniformities, the following particular means is mounted on the lap receiving plate 27. That is, as shown in FIGS. 8, 9 and 10, a pair of slits 40 and 41 are formed in the lap receiving plate 27 parallel to a lateral edge thereof, and a pair of lap rollers 42 and 43 are turnably mounted in the respective brackets 44a, 44b and 45a, 45b. The brackets 44a, 44b and 45a, 45b are secured to the under surface of the lap receiving plate 27 in such a manner that the lap rollers 42, 43 project upwards partially through the respective slits 40 and 41. The lap roller 42 is mounted in brackets 44a, 44b in a freely rotatable condition, while the lap roller 43 is supported by brackets 45a, 45b and is positively driven by the lifting motion of the lifting member 31 as hereinafter illustrated in detail. That is, a shaft 43' of the lap roller 43 extends so as to project outwardly from the bracket 45b, and a sprocket wheel 46 is rigidly mounted on the extended portion of the shaft 43'. A bracket 47 is secured to the underside of the lap receiving plate 27 and an intermediate shaft 48' is turnably mounted to the bracket 47. A sprocket wheel 48 is rigidly mounted on one end of the shaft 48' while a sprocket wheel 49 is rigidly mounted on the other end of the shaft 48'. A bracket 50 is rigidly mounted on the lifting member 31 and a shaft 51 is turnably supported by the bracket 50. A sprocket wheel 52 is rigidly mounted on one end of the shaft 51 while a pinion wheel 53 is rigidly mounted on the other end of the shaft 51. Endless chains 54 and 55 connect the sprocket wheel 46 to the sprocket wheel 48, and the sprocket wheel 49 to the sprocket wheel 52 in driving relation.

The channel 30 is provided with an upright rack 56 formed at a position where the rack 56 engages with the pinion 53. As mentioned above, when the lap receiving plate 27 is displaced upward in response to the upward displacement of the lifting member 31 in the channel 30, and while the pinion 53 engages with the rack 56 of the channel 30, the lifting member 31 is elevated at higher speed than that of the channel 30. Consequently, the pinion 53 is turned in the clockwise direction in FIG. 8, and the above-mentioned turning motion of the shaft 48' is transmitted to the lap roller 43 by way of the sprocket wheels 48, 46 and the endless chain 54 so that the lap roller 43 is also turned in the clockwise direction in FIG. 8. According to the above-mentioned turning motion of the lap roller 43, the lap 23 mounted on the lap rollers 42 and 43 is turned in a counterclockwise direction so that the free end portion 24 hanging from the lap receiving plate 27 is wound on the lap 23. When the lifting member 31 is displaced downward, the lap roller 43 is rotated in the counterclockwise directions. However, as there is not any lap on the lap receiving plate 27 this reverse rotation of the lap roller 43 does not create any undesirable effects.

It will be clearly understood that instead of the hydraulic cylinder mechanisms (38, 39), a conventional gear mechanism driven by a motor can be applied, in order to reciprocally move the lap lifting device 2.

Overhead Conveyor and Lap Carrier

Figure 12:
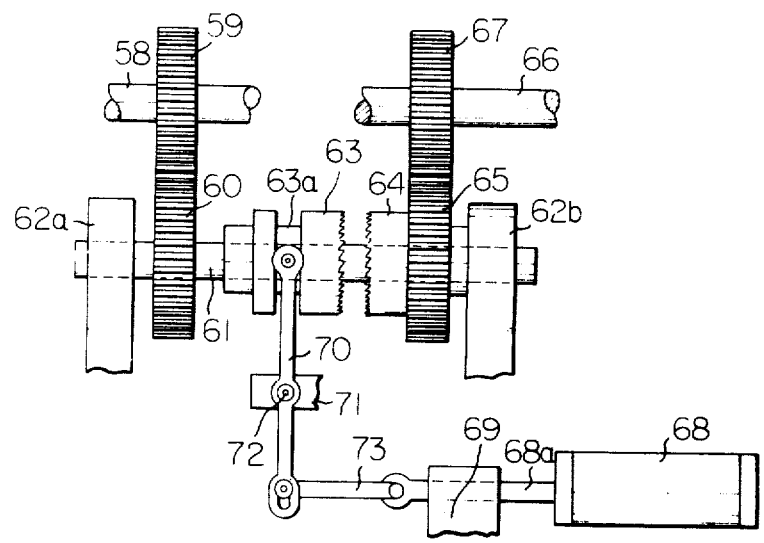
FIG. 12 is a schematic elevation of a driving mechanism of an overhead conveyer according to the present invention.

As already illustrated, the overhead endless conveyer 1 comprises a looped guide rail 9, which passes above the lap lifting device 2 and a plurality of lap supply devices 3, and an endless chainn 10 arranged chain the guide rail 9. The endless chain 10 is positively driven by a sprocket wheel 11, and the passage thereof is fixed by the guide sprocket wheels 12 as shown in FIG. 1. The sprocket wheel 11 is driven non-continuously by means of a driving mechanism shown in FIG. 12. Referring to FIG. 12, the driving mechanism comprises a driving shaft 58 which is continuously driven by a driving motor (not shown) by way of a gear train (not shown), a gear 59 secured ot the shaft 58, a gear 60 meshed with the gear 59, a clutch shaft 61 turnably supported by a pair of brackets 62a, 62b and rigidly securing the gear 60; a first clutch member 63 which is slidably mounted on the shaft 61 by spline engagement, a second clutch member 64 turnably mounted on the shaft 61, a gear 65 formed on an end portion of the second clutch member 64, a shaft 66 turnably disposed in parallel condition to the shaft 61, and a gear 67 secured to the shaft 66 in engaging condition to the gear 65. The first clutch member 63 is provided with an annular groove 63a.

A solenoid 68 is rigidly mounted on the machine frame of the overhead conveyer 1 and a plunger 68a of the solenoid 68 is slidably supported by a guide member 69 secured to the machine frame of the overhead conveyer 1. A rod 70 is turnably mounted on a bracket 71 secured to the abovementioned machine frame so as to turn about a pivot pin 72. A free end of the rod 70 is slidably engaged into the groove 63a of the first clutch member 63 and the other free end of the rod 70 is linked to a free end of the plunger 68a by way of a connecting rod 73. Consequently, the first and second clutch members 63, 64 are engaged or disengaged by the action of the solenoid 68. The driving sprocket wheel 11 is secured to the shaft 66 or a shaft (not shown) driven by the shaft 66. Therefore, the endless chain 10 can be non-continuously driven by actuating the solenoid 68.

Referring to FIGS. 1, 11A, 11B and 11C, a plurality of lap carriers 13 are rigidly connected to elements of the endless chain 10 with equal intervals therebetween. The lap carrier 13 comprises a trolley member 74 which is rigidly connected to a piece of endless chain 10 and provided with pairs of rolls 75 rotatably mounted thereon so as to guide the carrier 13 along the guide rail 9, an upright rod 76 connected at its top end to the trolley member 74, a base member 77 rigidly connected to the upright rod 76 and a holding device suspended from the base member 77. The holding device comprises a pair of gripping elements 78a, 78b turnably mounted on a horizontal pin 79, a pair of connecting pieces 80a, 80b, which are turnably connected to the corresponding gripping elements 78a, 78b by pins 81a, 81b, respectively, and turnably connected to each other by a horizontal pin 82 which is disposed in such a manner that it is capable of linearly moving in a pair of vertical slots 83 formed in the base member 77, and an expansion spring 84 connected to pins 81a and 81b so as to always urge the pins 81a and 8b toward each other. The gripping elements 78a, 78b are provided with horizontal jaws 85a, 85b, respectively. Consequently, the gripping elements 78a, 78b are capable of turning outwards about the pin 79 while the pin 82 is moved in the slots 83 upward or downward. The gripping element 78a is provided with a projection 86. An actuator 87 is disposed on the machine frame of the overhead conveyer 1 at a position adjacent to the lap lifting device 2 so as to control the motion of the gripping elements 78a, 78b of each lap carrier 13. A pair of guide plates 88a, 88b are mounted on the frame of the overhead conveyer 1 at a position above the lap lifting device 2 so as to position each lap carrier 13 in stable condition. As already illustrated, the detector 16 for detecting the arrival of a lap carrier 13 not holding a lap is mounted on the frame of the overhead conveyer 1. The detector 16 consists of a pair of component detectors 16a, 16b disposed on the machine frame 89 of the overhead conveyer 1. The component detector 16a is disposed at a position for detecting the arrival of the lap carrier 13, while the component detector 16b is disposed at a position for identifying whether the lap carrier 13 holds a lap 23 or not. The detector 16a comprises a light projector 90a and a photocell 90b which receives light projected from the light projector 90a. Therefore, when a lap carrier 13 shuts off the light beam from the projector 90a, the photocell 90b is actuated to issue a signal indicating the arrival of the lap carrier 13. The detector 16b comprises a light projector 91a and a photocell 91b which receives a light projected from the projector 91a. Therefore, if the projected light from the projector 91a is received by the photocell 91b, when the photocell 90b issues a signal indicating the arrival of the lap carrier 13, the photocell 91b issues a signal indicating the lap carrier 13 does not hold a lap. And on the other hand, if the light from the projector 91a is blocked by a lap held by the lap carrier 13, the photocell 91b does not issue a signal. As mentioned above, the detector 16a detects the arrival of the lap carrier 13 while the detector 16b identifies whether the lap carrier 13 holds a lap or not. The combined signal of these detectors 16a and 16b is utilized for actuating the motion of the lap carrier 13 by way of an actuator 87 mounted on the machine frame 89. A solenoid 93 is also disposed on the frame 89 of the overhead conveyer 1 at a corresponding position above the lap lifting device 2. The solenoid 93 is provided with a plunger 94 having a V-shaped slit 95 which positions the rod 76 of the lap carrier 13 at its correct working position when it is required to transfer a lap from the lap lifting device 2 to the lap carrier 13. The working condition of the plunger 94 is shown by a dotted line in FIG. 11C. The actuator 87 comprises a solenoid 97 rigidly mounted to the frame 89 of the overhead conveyer 1 and a base member 98 is slidably engaged to a dovetail guide groove 99 formed in the frame 89. A plunger 100 is connected to the base member 98 so that the base member 98 is capable of being reciprocally displaced along the guide groove 99 by the motion of the plunger 100. Another solenoid 101 is mounted on the base member 98 in such a position that a plunger 102 of the third solenoid 101 is capable of pushing the projection 86 when the base member 98 is displaced toward the lap carrier 13 by the motion of the solenoid 97. When the plunger 102 of the solenoid 101 pushes the projection 86, the jaws 85a, 85b are opened while the pin 82 is displaced upward, and when the plunger 102 is removed from the projection 86, the jaws 85a, 85b are returned to their rest position shown in FIG. 11A. The above-mentioned turning motion of the jaws 85a, 85b is carried out during the time the solenoid 93 is energized so as to hold the rod 76 of the lap carrier 13 by the plunger 94 thereof.

To control the sequential motion of the group of solenoids 68, 93, 97 and 101, a group of timing relays 103, 104 and 105 are mounted on a control box (not shown) which is mounted on the frame 89. The motion for transferring a lap 23 from the lap lifting device 2 to a lap carrier 13 is carried out as follows.

Figure 13:
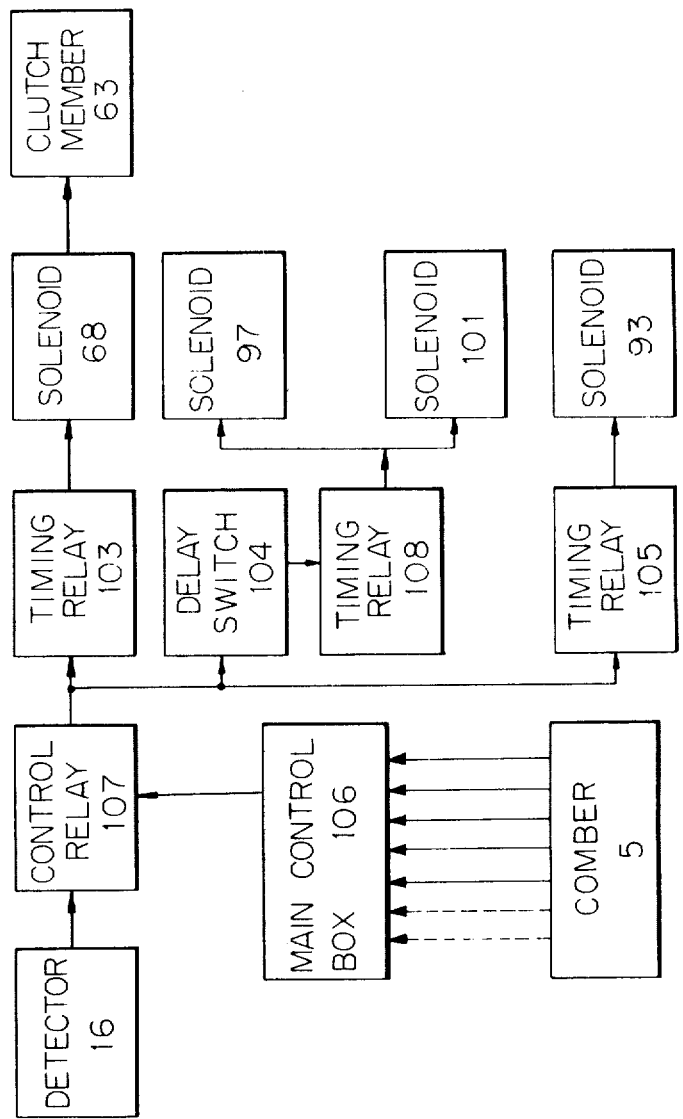
FIG. 13 is a block diagram of a mechanism for controlling the motion of holding a lap by a lap carrier according to the present invention.

Referring to FIG. 13, when a lap carrier 13 not holding a lap is carried to a position facing the detector 16, the detector 16 issues a signal which is applied to a control relay 107. The control relay 107 controls transmission of the signal of the detector 16 to timing relays 103 and 105, which transmit the signal to the respective solenoids 68 and 93, and to a delay switch 104 which transmits the signal to a timing relay 108 which actuates the solenoids 97 and 101. If the control relay 107 is in a closed condition which means that there is a requirement of a lap supply to any one of the combers 5, the signal from the detector 16 is transmitted to these timing relays 103, 105 and the delay switch 104. However, if the control relay 107 is in an opened condition which means there is no necessity of supplying a lap to any of the combers 5, the signal of the detector 16 is not transmitted to these timing relays 103, 105 and the delay switch 104.

Each lap supply device 3 is provided with a lap receiving member which receives a lap from the lap carrier 13 and a limit switch which issue a signal during the time the lap receiving member is free to hold a lap thereon. The detailed construction of this lap supply device 3 will be illustrated in detail later. The above-mentioned signal of each lap supply device is transmitted to a main control box 106 and the main control box 106 closes the control relay 107 if any of the lap supply devices 3 issues a signal continuously. Therefore, identical parallel circuits with respect to each of the combers 5 are connected to the control circuit of the main control box 106.

Figure 14:
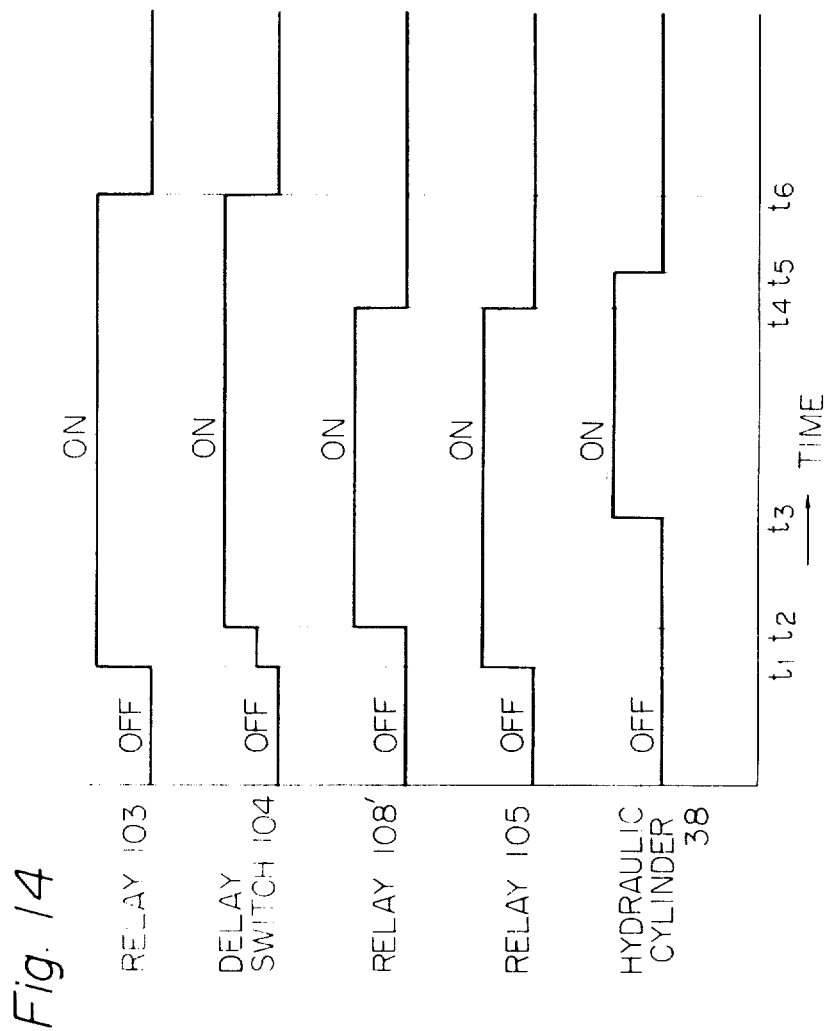
FIG. 14 is a diagram showing the relative timing of actuation of the component elements of the control mechanism shown in FIG. 13.

The operations of the timing relays 103, 105 and the delay switch 104 are controlled relative to the hydraulic cylinder 38 of the lap lifting device 2 as shown in FIG. 14.

Figure 5:
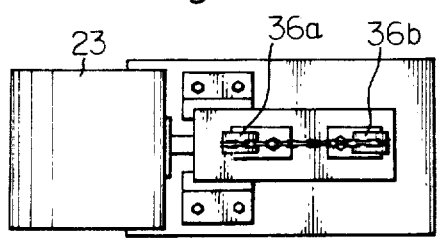
FIG. 5 is an enlarged plan view of the lap lifting device shown in FIG. 2.
Figure 11A:
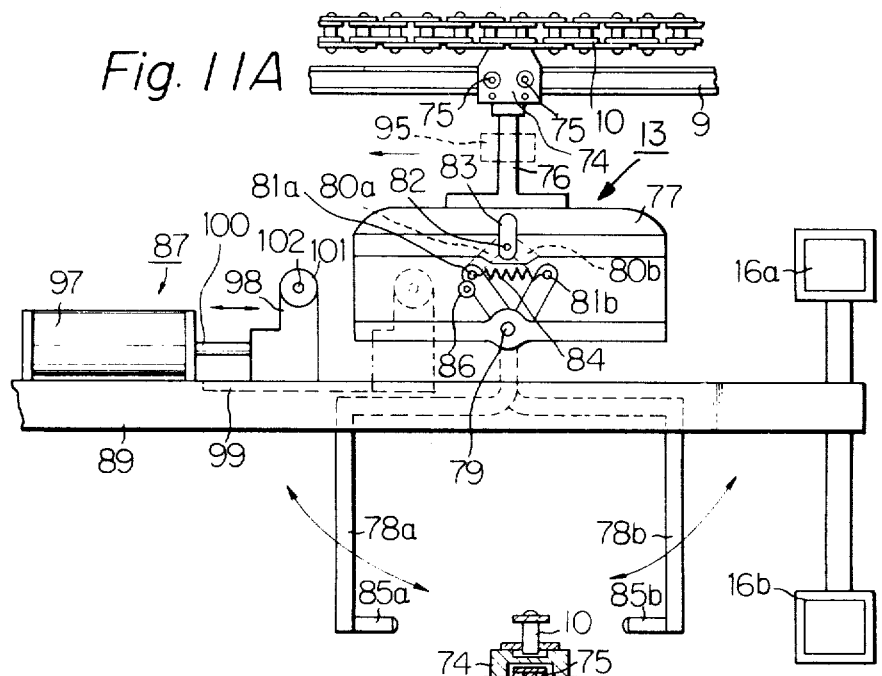
FIG. 11A is a front view of a lap carrier according to the present invention.
Figure 11B:
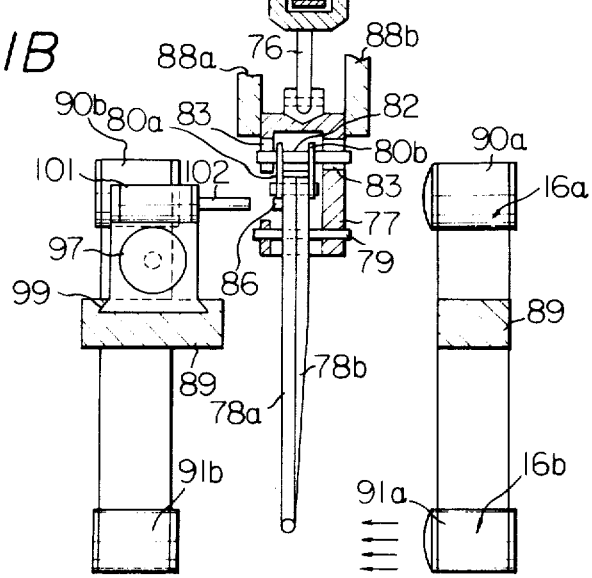
FIG. 11B is a side view of the lap carrier shown in FIG. 11A.
Figure 11C:
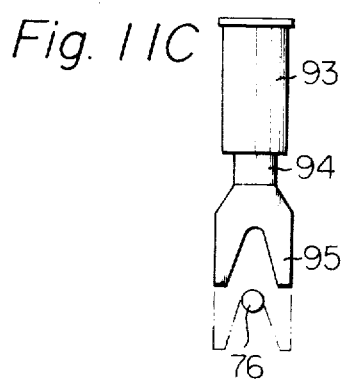
FIG. 11C is an elevational view of a device for aligning the lap carrier at a correct position, according to the present invention.

When the signal of the detector 16 is transmitted to the timing relays 103, 105 and the delay switch 104, the relays 103 and 105 actuate the solenoid 68 of the driving mechanism (FIG. 12) which is represented by time $t_1$. Consequently, the endless chain 10 is stopped and the plunger 94 of the solenoid 93 holds the carrier 13 at a predetermined working position above the lap lifting device 2, as shown in FIG. 15A. The signal is transmitted to the delay switch 104, and the output of the delay switch 104 actuates the relay 108 at a time $t_2$ so as to actuate the solenoids 97 and 101. According to the above-mentioned actuation of the solenoids 97 and 101, the plunger 102 approaches the projection 86 of the gripping element 78a. Accordingly, the projection 86 is urged against the expansion spring 84 so that the gripping elements 78a and 78b are turned about the pin 79 as shown in FIG. 15B which shows an opened condition of the gripping elements 78a, 78b of the lap carrier 13. Thereafter the hydraulic cylinder 38 of the lap lifting device 2 is actuated by a control device (not shown) at a predetermined time $t_3$. The time delay of the actuation by the control device can be carried out by a means similar to relay 108 and, consequently, detailed illustration of this control device is omitted. When the lap receiving plate 27 is displaced to a position shown in FIG. 15B, which corresponds to the position B shown in FIG. 5, then the timer relay 108 is switched off at the time $t_4$ so that the plungers 100 and 102 are retracted to their rest positions. According to the above-mentioned motion, the gripping elements 78a, 78b are returned to their rest positions shown in FIG. 15C by the expansion force of the spring 84 so that the jaws 85a, 85b are inserted into the bore of the bobbin of the lap 23. Thereafter the plunger 39 of the hydraulic cylinder 38 is retracted to its rest position at the time $t_5$. According to the above-mentioned motion, the lap 23 is transferred from the lap receiving plate 27 of the lap lifting device 2 to a lap carrier 13. Thereafter, the timing relay 103 and the delayed switch 104 are switched off, at the time $t_6$ so that the plunger 68a of the solenoid 68 (FIG. 12) is pushed to its rest position. Accordingly, the clutch member 63 is engaged with the clutch member 64 so that the sprocket wheel 11 is driven so as to drive the endless chain 10. Therefore the lap carrier 13 holding a lap 23 is displaced toward the lap supply devices 3.

It will be easily understood that the detectors 15 and 16 may, of course, by replaced by conventional limit switches, an explanation of which is omitted.

Bare Bobbin Carrier and Bare Bobbin Receiving Device

Figure 16A:
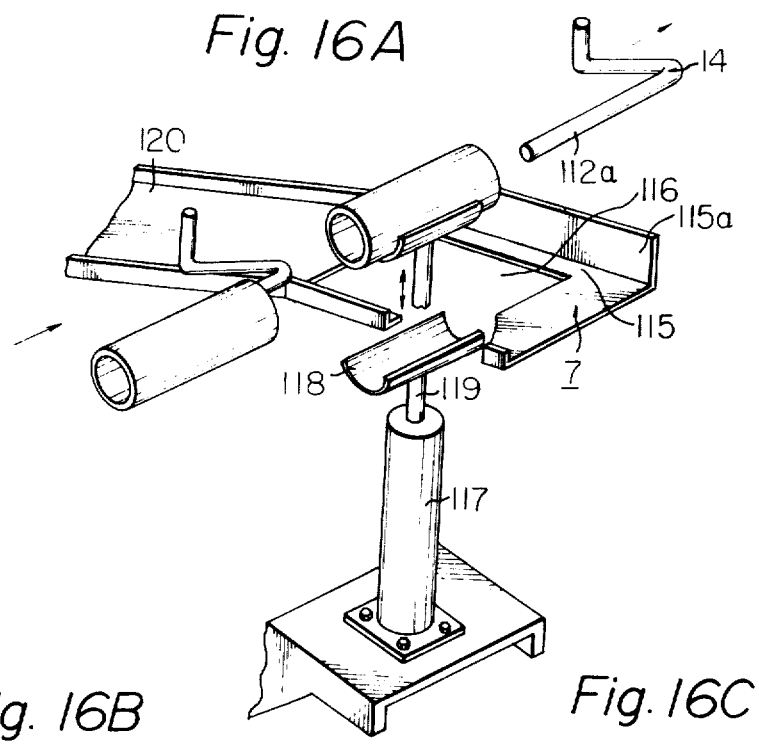
FIG. 16A is a perspective view of a bare bobbin receiving device according to the present invention.
Figure 16B:
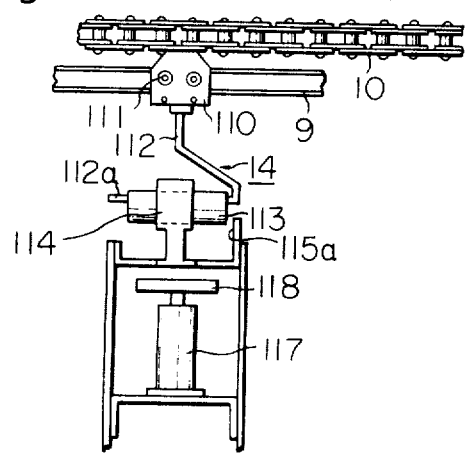
FIGS. 16B and 16C are front and side views of a bare bobbin carrier and a part of the overhead conveyer according to the present invention.
Figure 16C:
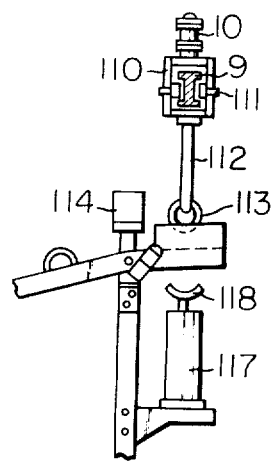

Referring to FIGS. 16A, 16B and 16C, a plurality of bare bobbin carriers 14 are rigidly connected to elements of the endless chain 10 with an equal interval therebetween like the lap carriers 13. The bare bobbin carrier 14 comprises a trolley member 110 which is rigidly connected to a piece of endless chain 10 and provided with pairs of rolls 111 rotatably mounted thereon so as to guide the carrier 14 along the guide rail 9, an upright rod 112 provided with a horizontal portion 112a formed at the free end portion thereof. Therefore, the horizontal portion 112a of the upright rod 112 is capable of supporting a bare bobbin 113 in such a way that the horizontal portion 112a is inserted into the bore of a bare bobbin 113. The above-mentioned operation is carried out manually at the stations where the combers 5 are installed. The lap carriers 13 and the bare bobbin carriers 14 are preferably arranged alternately on the endless chain 10. When a bare bobbin 113 is carried to a position above a bobbin receiving plate 115 of the bare bobbin hopper 7, a detector 114 detects the arrival of a bare bobbin 113 at the position. The detector 114 is mounted on the bobbin hopper 7. To identify a bare bobbin from a lap 23 carried by a lap carrier 13 which has not been transferred to the lap supply device 3 and is being carried along the passage of the overhead conveyer 1, a reflection type detector such as the detector disclosed in the British Pat. No. 848,008 is preferably utilized. In this case, it is desirable to cover the bare bobbin by a scotch tape material. The bobbin receiving plate 115 is provided with a cut out opening 116. A hydraulic cylinder 117 is disposed below the opening 116 and a bobbin receiving member 118 is rigidly supported by a plunger 119 of the hydraulic cylinder 117.

The opening 116 is sufficiently large to permit passing of the bobbin receiving member 118 therethrough but cannot pass a bare bobbin 113 therethrough. The hydraulic cylinder 117 is supplied with pressurized fluid from a supply source (not shown) according to an output signal of the detector 114 when the arrival of a bare bobbin 113 is identified thereby. When the hydraulic cylinder 117 is actuated, the bobbin receiving member 118 is immediately displaced upward to a predetermined position where the member 118 pushes a bare bobbin 113 a little upward from the position in which it is held by the bare bobbin carrier 14. According to the above-mentioned motion, the horizontal portion 112a no longer supports the bare bobbin 113 so that the bare bobbin 113 is positioned on the bobbin receiving member 118. The bobbin receiving plate 115 is provided with a side wall 115a with which a portion of the leading end of a bare bobbin is engaged, and a portion 120 sloped downward. The longitudinal direction of the bobbin receiving plate 115 is perpendicular to the passage of the overhead conveyer 1. After a predetermined time during which the bobbin transfer motion from the bobbin carrier 14 to the bobbin receiving member 118 is completed, the plunger 119 is retracted into the cylinder 117 so that the member 118 descends to a rest position below the plate 115. The above-mentioned action of the hydraulic cylinder 117 is controlled by a time relay (not shown). According to the above-mentioned motion of the member 118, the bare bobbin 113 is separated from the member 118, rests on the plate 115 and rolls on the sloped portion 120 of the bobbin receiving plate 115 toward a delivery exit thereof. The delivery exit of the bobbin receiving plate 115 is connected to an automatic bobbin supply device (not shown) of the lap forming machine 4.

Figure 26:
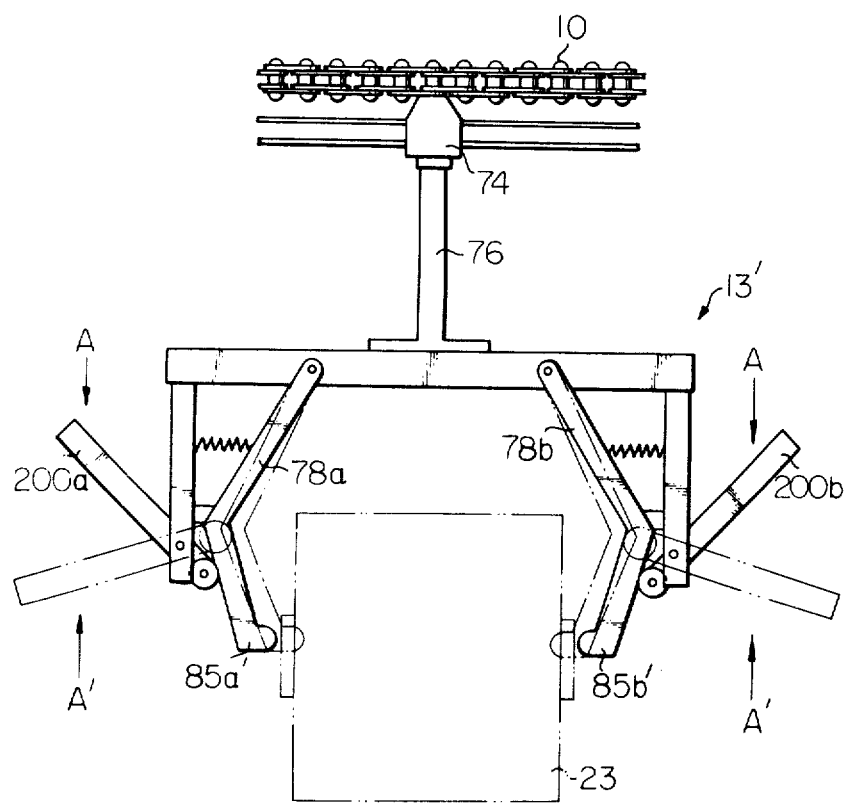
FIG. 26 is a front view of a lap carrier of an other type.

Any type of lap carrier usually used in this field may also be utilized without large modification of the construction of the present apparatus or the components thereof. For example, a lap carrier 13' as schematically shown in FIG. 26 is known and the operation thereof is only briefly explained below.

The swinging movement of gripping elements 78a' and 78b', to receive a lap 23 from the lap supply device 2 (FIGS. 1 and 2) and to drop a lap 23 onto the lap supporting plates 159a, 159b of lap supply device 3 (FIGS. 1 and 22), is provided by applying an external force in the perpendicular directions A and A' by, for example, hydraulic cylinders, to swing lever 200a and 200b. In FIG. 26, the condition where the lap carrier 13' holds a lap 23 is shown by the two dotted lines. Detailed explanations of the construction and operation of the carrier 13' is omitted, because they can easily be understood by those skilled in this build.

Lap Supply Device

Figure 17:
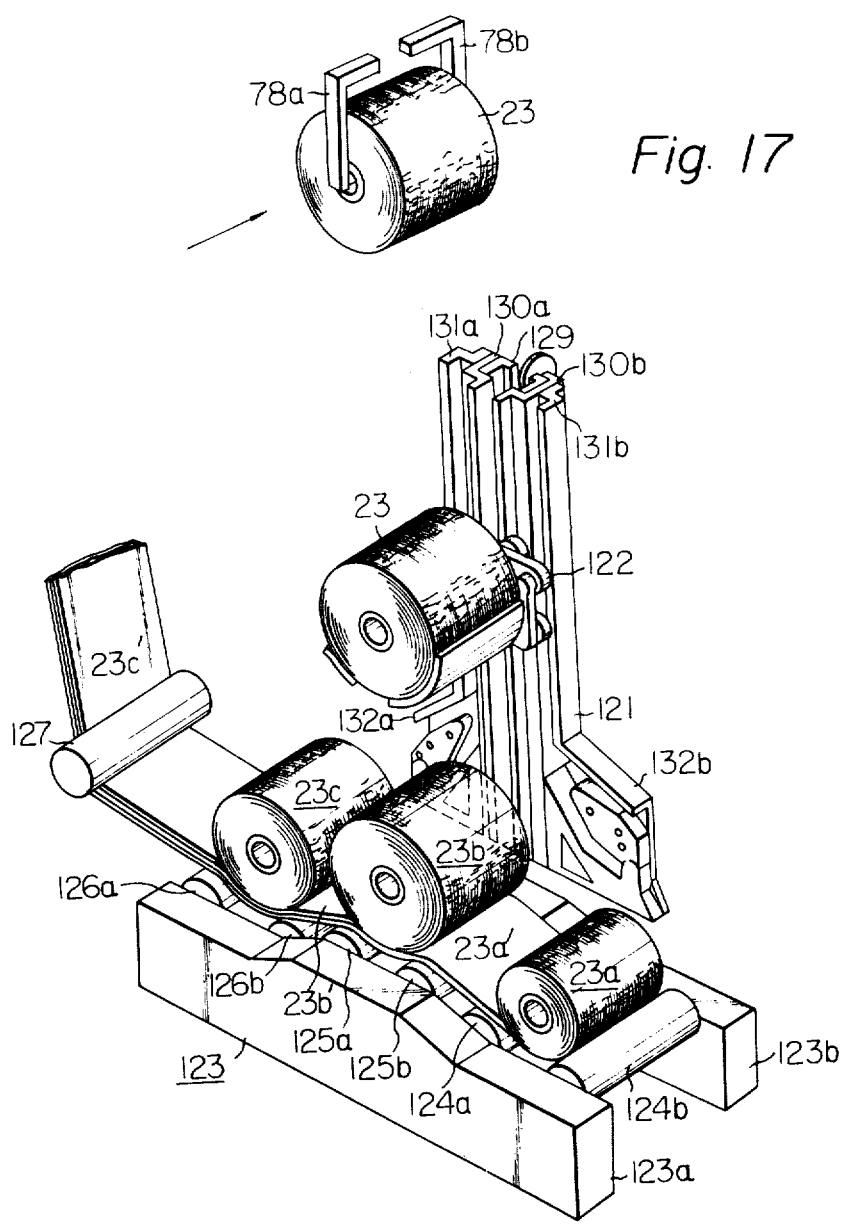
FIG. 17 is a perspective view of the lap supply device, according to the present invention.
Figure 24A:
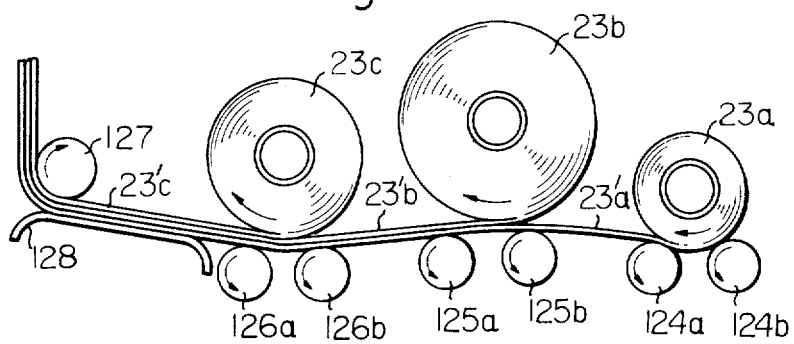
FIGS. 24A, 24B and 24C are explanatory drawings showing a method for mounting laps on a lap stand of a comber according to the present invention.
Figure 24B:
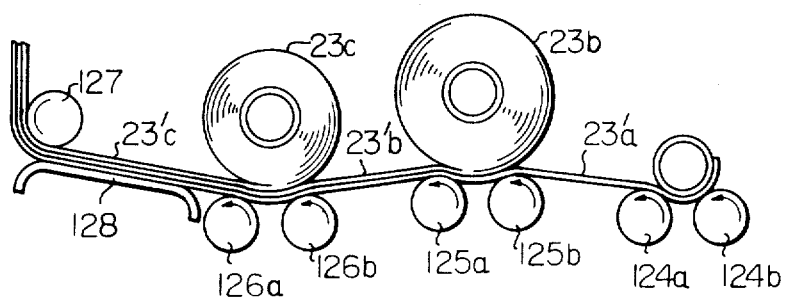
Figure 24C:
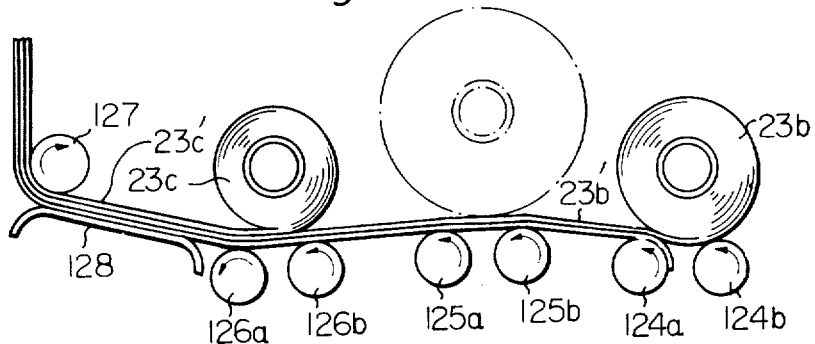

Referring to FIGS. 17 and 18, the lap supply device comprises an upright guide stand 121 and a lap supporting member 122 which is capable of moving upward or downward along the guide stand 121. A guide stand 121 is disposed at a position adjacent to the lap supply stand 123 of each comber 5. The lap supply stand 125 is provided with triple pairs of lap rollers 124a, 124b; 125a, 125b; and 126a, 126b and a guide roller 127, which are rotatably mounted on stands 123a, 123b parallel to each other. These lap rollers 124a, 124b; 125a, 125b; and 126a, 126b, are positively driven toward the supplying direction by way of a gear train (not shown) disposed in the stand 123a. In this embodiment three webs 23a', 23b' and 23c' from three laps 23a, 23b and 23c are supplied to the comber 5 in superimposed condition. The lap 23a is resting on the rollers 124a and 124b, and a fiber web 23a' delivered to the guide roller 127; the lap 23b is resting on the rollers 125a, 125b by way of the fiber web 23a', and a fiber web 23b' is delivered to the guide roller 127 together with the fiber web 23a'; the lap 23c is resting on the rollers 126a, 126b by way of the fiber webs 23a' and 23b', and a fiber web 23c' is delivered to the guide roller 127 together with the fiber webs 23a' and 23b'. A fresh lap is always ready to be supplied to a rest position defined by the rollers 125a and 125b. At the first stage of lap supply to the comber 5, as shown in FIG. 24A, the smallest lap 23a is positioned upon the rollers 124a, 124b, the middle size lap 23c is positioned upon the rollers 126a, 126b while the largest lap 23b is positioned upon the rollers 125a, 125b. FIG. 24B shows a condition in which the fiber web 23a' of the lap 23a is almost exhausted. Given this condition the bobbin of the exhausted lap 23a is taken off manually, and the laps 23b is rolled to the rest positions defined by the rollers 124a, 124b, as shown in FIG. 24C, so as to prepare a space for receiving a fresh lap from the lap supply device 3. When a fresh lap is transferred from the lap supply device 3 to the above-mentioned position defined by the rollers 125a, 125b, a leading end of the fiber web of the fresh lap is carefully handled manually so as to prevent creation of irregular thickness of the combined fiber webs supplied to the comber 5.

The upright guide stand 121 comprises an upright grooved stand 129 provided with a pair of guide members 130a, 130b secured to both sides thereof respectively. Each guide member 130 has a Z-shaped lateral cross section. Side rails 131a, 131b are symmetrically secured to an upper half side portion of each guide member 130a, 130b. These side rails 131a, 131b also have a Z-shaped lateral cross section. Guide rails 132a, 132b (which are formed so as to provide looped passageways) are secured to a lower half side portion of the guide members 130a, 130b, respectively.

Figure 20:
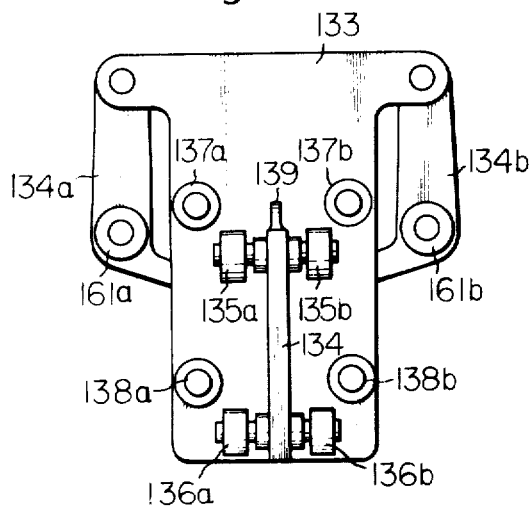
FIG. 20 is a back side view of a lap receiving member shown in FIG. 17.
Figure 21:
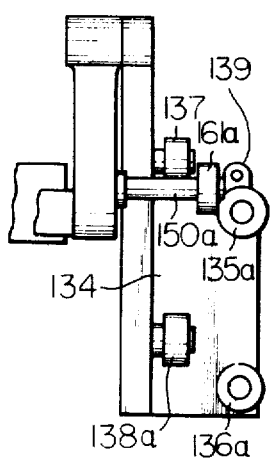
FIG. 21 is a side view of a main portion of the lap receiving member shown in FIG. 17.

The lap supporting member 122 comprises a lifting member 133 and a pair of swing arms 134a, 134b (FIG. 20). As shown in FIGS. 19, 20 and 21, the lifting member 133 is provided with a wall portion 134 projecting rearward. The wall portion 134 extends into the inside space of the upright grooved stand 129 by way of an intervening space between the guide members 130a, 130b. Duplicate pairs of guide rollers 135a, 135b and 136a, 136b are turnably mounted on the wall portion 134 in such a condition that these guide rollers 135a, 135b; 136a, 136b contact the respective guide members 130. Duplicate pairs of guide rollers 137a, 137b, and 138a, 138b are turnably mounted on the lifting member 133 at symmetrical positions with respect to the wall portion 134 in such a condition that these rollers 137a, 137b and 138a, 138b contact the respective guide members 130a, 130b. A chain fixing member 139 is secured to a top portion of the wall portion 134. As shown in FIGS. 17 and 18, a sprocket wheel 140 is turnably mounted on a top portion of the upright grooved stand 129, and the chain fixing member 139 (shown in FIGS. 20 and 21) is connected to a chain winding mechanism 141 by way of a chain 142 running over the sprocket wheel 140. The chain winding mechanism 141 is mounted on a base 143 which secures the guide stand 121. The chain winding mechanism 141 comprises a horizontal shaft 144, to which a chain winding pulley 145 and a worm wheel 146 are secured, and a worm 147 engages with the worm wheel 146; a bevel gear 148 rigidly mounted on a worm shaft 149, a pair of bevel gears 150a, 150b rigidly mounted on a clutch shaft 151 which is slidably mounted on a driving shaft 152 in spline engaging condition; a solenoid 153 which actuates the motion of the clutch shaft 151 by way of a plunger 154, and a link motion mechanism 155 as shown in FIG. 23. Therefore the chain winding pulley 145 can be turned toward the winding direction or unwinding direction according to the alternative engagement of the bevel gear 148 with the bevel gear 150a or bevel gear 150b. The above-mentioned alternative engagement is carried out by the action of the solenoid 153. The driving shaft 152 is driven by a motor (not shown) which is selectively driven when the lap supply device 3 is required to operate. In this embodiment, the chain winding mechanism 141 is utilized to displace the lifting member 133 upward or downward, however, a hydraulic mechanism such as the device shown in the lap lifting device 2 can be satisfactorily utilized instead of the chain winding mechanism 141.

Figure 25:
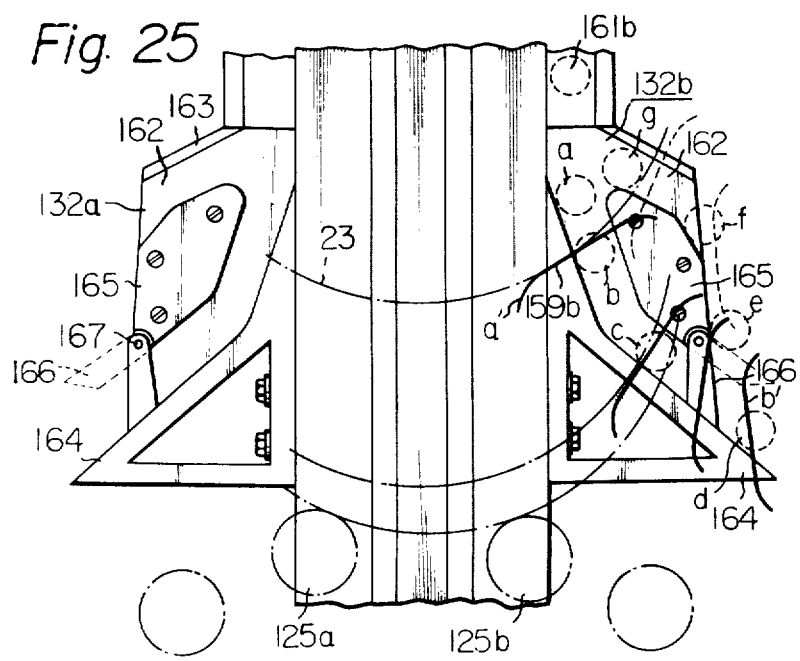
FIG. 25 is an explanatory front view of a main portion of the lap receiving member, showing the working function thereof.

As shown in FIGS. 19, 21 and 22, the lifting member 133 is provided with a pair of swing arms 157a, 157b turnably pivoted thereto by pivot shafts 158a, 158b, respectively, and lap supporting plates 159a, 159b are rigidly mounted to bottom end portions 157a', 157b' of the swing arms 157a, 157b, respectively. A pair of shafts 160a, 160b are secured to the swing arms 157a, 157b, respectively, and a pair of guide rollers 161a, 161b are turnably mounted on the shafts 160a, 160b, respectively, as shown in FIG. 19. The swing arms 157a, 157b are capable of swinging about the pivot shafts 158a, 158b, respectively. However according to the above-mentioned construction of the guide stand 121, their free swing motions are restricted as hereinafter described in detail. When the guide rollers 161a, 161b are displaced along the side rail portion, the lap supporting plates 159a, 159b are displaced in a condition capable of supporting a lap 23 as shown in FIG. 22. As shown in FIGS. 17, 25, the guide rail portions 132a, 132b (which are formed so as to provide a looped passageway for the guide rollers 161a, 161b) are secured to the lower half portion of the guide members 130a, 130b, respectively. Each of the guide rail portions 132a or 132b is formed by a side plate 162 enclosed by an upper projecting plate 163 and a bottom projecting plate 164, and a block 165 is secured to a middle portion thereof. A control piece member 166 is turnably mounted to a shaft 167 secured to a bottom side position of the block 165.

In this embodiment, a push button system for actuating the lap supply device 3 (FIG. 1) is applied. That is, a push button control system (not shown) is mounted on each of the lap supply devices 3. When an operator finds it is necessary to supply a lap to one of the combers 5, he pushes the push button so as to start the motor of the chain winding mechanism 141 (FIG. 18) and actuate the solenoid 153 (FIG. 23). According to the winding motion of the chain 142, the lap supporting plates 159a, 159b (FIG. 18) are displaced to a waiting position, defined by the adjacent lifting member 133 and below the lap carrying passage of the overhead conveyer 1 (FIG. 1), and stopped when a limit switch (not shown) detects the arrival of the lifting member 133 at the above-mentioned elevated position. In this condition, the solenoid 153 (FIG. 23) is energized by the signal of the above-mentioned limit switch so that the engagement of the bevel gear 148 with the bevel gear 150a is disconnected, and after a predetermined time the bevel gear 148 is engaged with the bevel gear 150b. The above-mentioned disengagement and delayed engagement are controlled by utilizing a conventional timer relay (not shown).

The above-mentioned push buttons are connected to a main control box which controls the operation of the detectors 15 so that only one detector 15 is in operation at one time. When one of the push buttons is pushed the main control box sends out a signal to actuate the operation of the detector 15 corresponding to the lap supply device 3 for which the button was pushed. When a plurality of push buttons have been pushed, the main control box memorizes the order in which the buttons were pushed and sends out signals actuating the detectors 15 in the same order. The detector 15 has substantially the same construction as the detector 16 (shown in FIGS. 11A and 11B), which has already been illustrated. A detector 15 actuated by the main control box produces a signal to stop a lap carrier 13 holding a lap, and also produces a signal to actuate the solenoid 68 (FIG. 12) for disengaging clutch members 63 and 64, so that the lap carrier 13 (FIG. 1) holding a lap stops at a correct working position above the lap supplying device 3. The detector 15 also produces a signal to activate actuators (which have the same construction as the actuators 87 and 93 shown in FIGS. 11A and 11C) for dropping a lap onto a pair of lap supporting plates 159a, 159b (FIG. 17) of the lap supply device 3 (FIG. 18). The detector 15 for detecting the arrival of the lap carrier 13 holding a lap is directly actuated by the above-mentioned push button. Therefore, only the comber 5 for which the operator pushed the button is capable of receiving a lap, and the other combers 5 for which the operator has not pushed the push button are not supplied a lap.

The above-mentioned lap transfer motion for transferring a lap from the lap carrier 13 to the lap supporting plates 159a, 159b is illustrated hereinafter. When the push button system is manually actuated, light projectors (which have the same construction as light projectors 91a, 91b shown in FIG. 11B) of the detector 15 are energized to detect the arrival of the lap carrier 13 holding a lap. When the detector 15 (FIG. 1) detects the arrival of the lap carrier 13 holding a lap and issues a signal, the signal is transmitted to the timing relays 103, 105, the delay switch 104 (FIG. 13) and a solenoid (not shown) for engaging the connection of the driving shaft 152 (FIG. 23) with the driving motor (not shown) of the chain winding mechanism 141. The lap 23 held by the gripping elements 78a, 78b (FIG. 15C) leaves the carrier 13 when these elements 78a, 78b are opened and the lap 23 drops on the lap supporting plates 159a and 159b (FIG. 22). The lifting member 143 (FIG. 18) is simultaneously displaced downward because the bevel gear 148 (FIG. 23) has engaged with the bevel gear 150b which provides a reverse turning motion of the shaft 149 to that of the engagement of the bevel gear 148 with the bevel gear 150a for lifting the member 133. When the lifting member 133 is displaced to a predetermined lowermost position, a limit switch (not shown) is actuated so as to open the connection of the push button system to an electric source.

During the above-mentioned downward displacement of the lifting member 133 (FIG. 18), the lap supporting plates 159a and 159b are automatically opened so as to drop the lap 23 (not shown) upon the lap stand 123.

As the mechanisms for turning the lap supporting plates 159a and 159b are identical, only one of them is illustrated. Referring to FIGS. 17, 22, 23 and 25, the guide roller 161b is displaced downward along a perpendicular passage, and arrives at a top end of the guide rail 132b. In response to the further downward displacement of the guide roller 161b, the roller 161b contacts the bottom projected plate 164, and the guide roller 161b is forced to displace outward, in other words, the guide roller 161b is displaced along a passage defined by positions a, b, c in FIG. 25.

In the following description, the explanation with respect to guide roller 161a is omitted because it exactly corresponds to the explanation with respect to guide roller 161b. According to the above-mentioned motion of the guide roller 161b, the swing arm 157b (not shown) turns toward the outside so that the lap supporting plate 159b is displaced to positions represented by a', b', the plate 159a (not shown) is also turned symmetrically at the same time as plate 159b. Thus, a lap 23 is dropped from these supporting plates 159a (not shown) and 159b to a position defined by the rollers 125a, 125b. In this condition, the operator prepares a leading end of the fiber web from the lap 23 so that it is in the correct relationship to the other fiber webs 23b' and 23c' as shown in FIG. 24C. The guide roller 161b pushes the control piece member 166 so as to turn it toward the outside as shown by a dotted line on the left hand side of FIG. 25. Guide roller 161b stops its downward displacement at d and the member 166 returns to its rest position by its own weight. When the operator actuates the push button system again at the time of supplying a fresh lap, the chain winding mechanism 141 is actuated as already illustrated. In this condition, the lifting member 133 is displaced upward. During this upward motion of the lifting member 133, the guide roller 161b passes along a passage defined in FIG. 25 by positions e and f above the member 166 and the block 165, and after passing position g, the guide roller 161b returns to the perpendicular passage along the side rail 131. Consequently, any undesirable contact of the lap supporting plates 159a, 159b with a fresh lap supplied to the position defined by the rollers 125a, 125b is perfectly prevented.

In the above-mentioned embodiment, only one lap forming machine is utilized. However, more than two lap forming machines are utilized to maintain the production balance between the lap forming process and combing process.

As mentioned above, in the automatic lap supply apparatus according to the present invention, the lap lifting device 2 is provided with a particular mechanism for wrapping a free end of fiber web onto the body of a lap, so that any undesirable effects due to the free hanging of the end of the fiber web during transportation can be perfectly prevented. Moreover, when a lap is received from a lap carrier 13 and displaced toward a lap stand of a comber in the lap supply device 3, a pair of lap supporting members are gradually opened automatically when the supporting members come to a position adjacent to the lap stand, and the lap supply motion to the lap stand can be easily carried out without damaging a lap supplied to the lap stand. Further, when a lap is exhausted on the lap stand, a bare bobbin can be easily mounted on a bare bobbin carrier 14 by manual operation, and when the bare bobbins are carried to a position above a bare bobbin hopper connected to a lap forming machine 4 by the bare bobbin carriers 14, the bare bobbins are automatically transferred to the hopper and, therefore, the troublesome manual operation of carrying bare bobbins to the lap forming machine 2 is completely eliminated. Consequently, the labor cost related to the lap supply operation and bare bobbin transfer operation can be remarkably reduced according to the present invention.

What is claimed is:

1. In an automatic apparatus for supplying laps from at least one lap forming machine to lap stands of a group of combers by means of an overhead conveyer provided with a plurality of lap carriers and bare bobbin carriers, an improvement comprising in combination:

a. a lap transfer system comprising, a lap lifting device for lifting a lap received from said lap forming machine to a position for transferring said lap to a lap carrier, a first detector for detecting the arrival of a lap carrier not holding a lap, and an actuating means for enabling said lap carrier to receive a lap from said lap lifting device after receipt of an actuation signal from said detector;

b. a lap supply system comprising, a second detector for detecting the arrival of a lap carrier holding a lap, an actuator means for enabling said lap carrier to drop said lap, lap supporting means for receiving said lap dropped from said lap carrier, and means for displacing said lap supporting means to a waiting position to receive said lap from said lap carrier and for displacing said lap supporting means to an adjacent upper position above said lap stand and for opening said supporting means during downward displacement thereof at the terminal zone of said downward displacement so that said lap is dropped to said lap stand;

c. means for automatically controlling the sequential operation between said lap lifting device and lap carriers, and between said lap supporting means and lap carriers.

2. An automatic apparatus for supplying laps according to claim 1, further comprising means for automatically transferring bare bobbins from bare bobbin carriers to a bare bobbin hopper connected to said lap forming machine.

3. An automatic apparatus for supplying laps according to claim 1, further comprising means for stopping said overhead carrier during said sequential operations between said lap lifting device and lap carriers, and said lap supporting means and lap carriers.

4. An automatic apparatus for supplying laps according to claim 1, wherein said lap lifting device is provided with a lap receiving plate for receiving a lap from said lap forming machine and for lifting said lap to a position to transfer said lap to said lap carrier, said lap receiving plate being provided with means for winding a free end of fiber web onto the main body of said lap during said lifting motion.

5. An automatic apparatus for supplying laps according to claim 1, wherein said displacing means comprises an upright guide stand disposed at a position adjacent to said lap stand of said comber, a pair of side rails secured to the upper half side portions of said guide stand in symmetrical relationship, a pair of guide rails which are formed to provide looped passageways secured to the lower half side portions of said guide stands in symmetrical relationship and a drive mechanism for displacing said lap supporting means; said supporting means comprising a lifting member provided with guide rollers and a pair of swing arms provided with guide rollers and a pair of lap supporting plates secured to a bottom portion of said swing arms respectively; said drive mechanism being connected to said lifting member by way of a chain drive means, said guide rollers of said lifting member displaceably engaging with upright grooves formed in said upright guide stand, said guide rollers of said swing arms displaceably engaging with guide grooves formed in both sides of said upright guide stand by said side rails and said guide rails respectively, whereby said lifting member is displaced upward or downward alternatively by engaging said guide rollers thereof with the upright guide stand, said lap supporting members are displaced in closed condition while said guide rollers mounted to said swing arms are displaced along said side rails respectively and are gradually opened when said guide rollers of said swing arms are displaced downward along said guide rails respectively and are gradually closed when said guide rollers of said swing arms are displaced upward along said guide rail respectively.

6. An automatic apparatus for supplying laps according to claim 2, wherein said automatic bare bobbin transfer means comprises a detector for detecting the arrival of said bare bobbin carrier holding a bare bobbin, a drive means for providing reciprocal movement actuated in response to a signal from said detector, said drive means being disposed below said bare bobbin hopper provided with an opening and side wall, and a bobbin receiving plate connected to the top end of a plunger of said fluid cylinder, said opening of said bare bobbin hopper being formed in sufficient size for permitting the passing of said bobbin receiving plate but not permitting the passing of said bare bobbin, said side wall of the bare bobbin hopper being engaged with the leading end of a bare bobbin to take the bare bobbin from the bare bobbin carrier.

* * * * *